United States Patent [19]

Patel et al.

[11] 3,831,951

[45] Aug. 27, 1974

[54] FACE TYPE O-RING SEAL GROOVE AND METHOD OF PRODUCING SAME

[75] Inventors: Hiralal V. Patel, Cleveland; Arthur E. Liggett, Bedford, both of Ohio

[73] Assignee: The Weatherhead Company, Cleveland, Ohio

[22] Filed: Apr. 26, 1972

[21] Appl. No.: 247,724

[52] U.S. Cl. ............................. 277/170, 285/379
[51] Int. Cl. .................................. F16j 15/10
[58] Field of Search ........ 277/9, 11, 170, 171, 169; 285/379, 137

[56] References Cited
UNITED STATES PATENTS

| | | | |
|---|---|---|---|
| 1,460,623 | 7/1923 | Tobolla | 285/379 |
| 2,885,227 | 5/1959 | Burger | 277/9 |
| 3,184,247 | 5/1965 | Leutwyler | 277/170 |
| 3,765,647 | 10/1973 | Grove et al. | 251/317 |

*Primary Examiner*—Louis R. Prince
*Assistant Examiner*—Robert I. Smith
*Attorney, Agent, or Firm*—McNenny, Farrington, Pearne & Gordon

[57] ABSTRACT

A face seal for a planar member and a method of providing such a face seal are disclosed. The face seal includes an O-ring which is trapped within an annular groove having at least a portion of at least one sidewall stressed beyond its elastic limit to form an acute angle with the bottom wall of the groove and to thereby form a trap to retain the O-ring. The sidewall may be stressed by cutting into the face of the planar member concentrically around and/or concentrically within the groove and simultaneously forcing one or both sidewalls into the groove to form the acute angle. Alternately, only portions of a sidewall may be forced into the groove by deforming localized areas of the planar member adjacent a sidewall. As a further alternative, the sidewall may be stressed by providing a second annular groove in the member surrounding and/or surrounded by the first groove to form an annular wall and then deforming the annular wall into the first groove to form the acute angle. If the O-ring groove closely surrounds a port in the planar member so that a relatively thin wall is defined by the groove and port, the thin wall may be forced into the groove to form the acute angle by a flaring tool inserted in the port to thereby form a trap for the O-ring.

3 Claims, 11 Drawing Figures

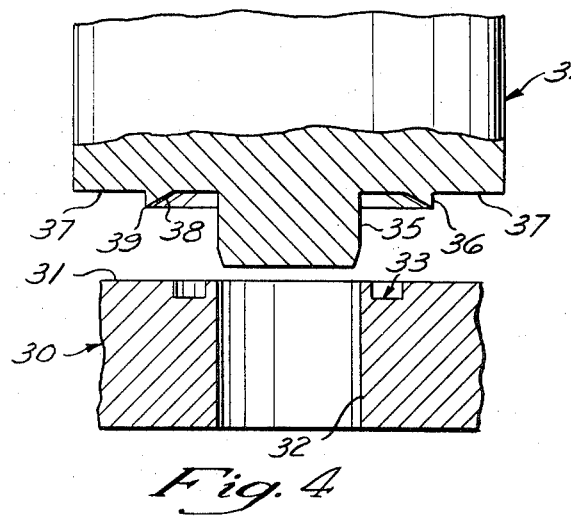
Fig. 4
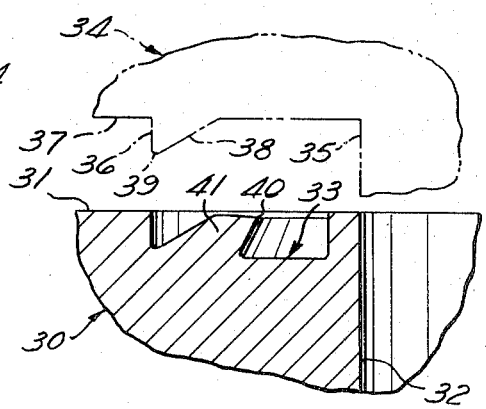
Fig. 5
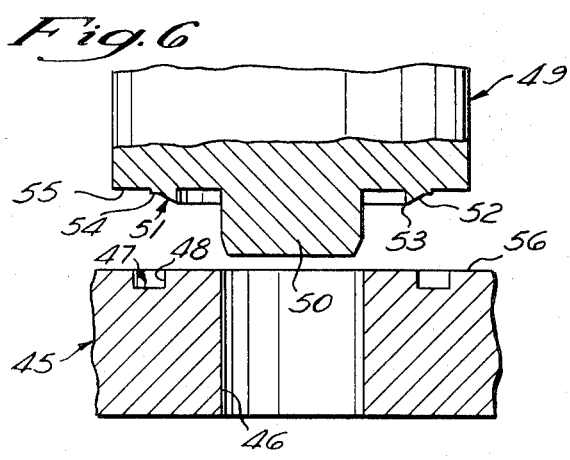
Fig. 6
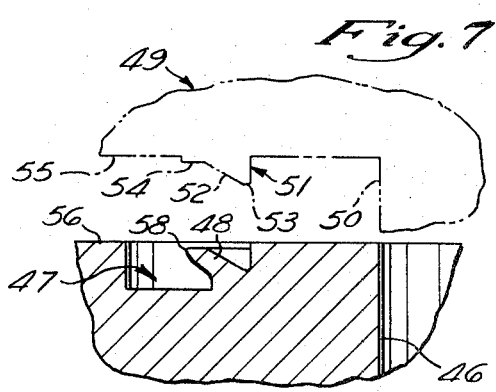
Fig. 7
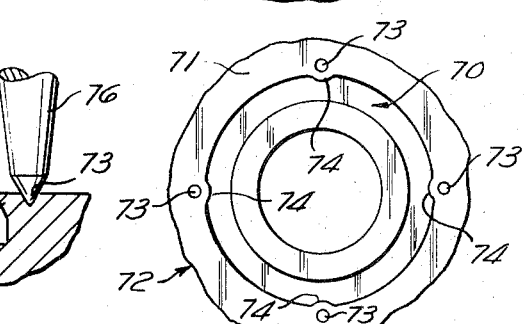
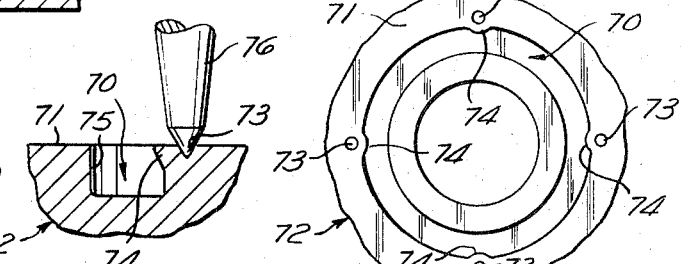
Fig. 10
Fig. 11
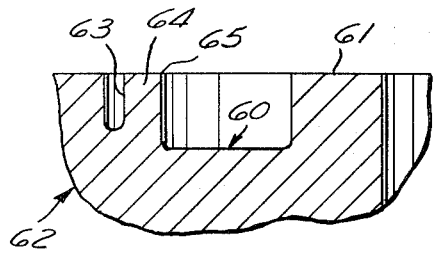
Fig. 8
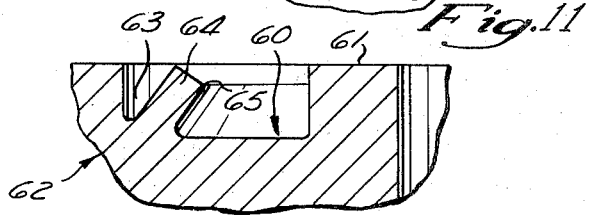
Fig. 9

3,831,951

FACE TYPE O-RING SEAL GROOVE AND METHOD OF PRODUCING SAME

BACKGROUND OF THE INVENTION

To form a seal against fluid pressure loss between planar faces of members, it is customary to encircle the area to be sealed with an O-ring mounted within an annular groove in one of the members prior to assembling the planar faces of the members in face-to-face apposition. While no particular problems are encountered in an operation wherein the member having the annular groove is assembled in a substantially upwardly facing position, the O-ring tends to fall out of the groove prior to assembly of the members if the member is jarred or if the member must be assembled in a substantially vertical or inverted position.

To overcome this problem, O-ring manufacturers recommend that a dovetail groove be machined so that the O-ring is trapped by the converging sidewalls of the groove. This recommendation has not been widely accepted, since it is quite expensive to machine such dovetail grooves. Further attempts to retain the O-ring in its groove prior to assembly involve the use of an adhesive or grease to secure the O-ring within the groove. Extreme care must be exercised in using adhesives, since the member and the groove must be maintained in a clean condition for the adhesive to function and grease does not provide a secure bond between the O-ring and the groove. Furthermore, grease and adhesives tend to pick up foreign matter and such foreign matter may interfere with the seal, particularly if it is present on the face of the member. Moreover, these hand operations add to the cost of manufacturing.

SUMMARY OF THE INVENTION

This invention overcomes these prior art problems by providing an O-ring groove which traps the O-ring in place and which does not require expensive machining or hand operations. According to this invention, an O-ring groove is manufactured by first machining an O-ring groove in the flat face of a member and around an area to be sealed. At least one of the sidewalls of the groove so formed is deformed into the groove so that it forms an acute angle with the bottom wall of the groove and so that an upper lip of the deformed sidewall is spaced from the bottom wall a distance which exceeds the sectional radius of the O-ring and which defines a circle having a diameter less than the outside diameter but greater than the inside diameter of an O-ring to be inserted in the groove. When the O-ring is inserted in the groove, it is trapped by the deformed sidewall.

The deforming operation may be accomplished by a coining technique wherein a cut is made into the face of the member concentrically around and/or concentrically within the groove and a relatively narrow wall defined by the cut and the adjacent sidewall of the groove is simultaneously forced into the groove to form an acute angle with the bottom wall of the groove.

Alternately, a second annular groove may be machined in the planar face of the member so that it surrounds and/or is surrounded by the O-ring groove to form an annular wall between the grooves. This annular wall may then be deformed into the O-ring groove by a coining or spinning operation to form an acute angle with the bottom wall of the O-ring groove.

If the O-ring groove closely surrounds a port in the member so that a relatively thin wall is defined by the groove and the port, the thin wall may be forced into the groove by a flaring tool inserted in the port to thereby form a trap for the O-ring to be inserted in the groove.

Furthermore, a trap for an O-ring may be formed by applying localized deforming pressure to areas of the planar face adjacent a wall so as to force portions of the wall into the O-ring groove. This operation may be performed by a conventional staking tool.

According to a further aspect of this invention, the deformed sidewall of the O-ring groove may be dimensioned so that it traps the O-ring in such a manner that the O-ring is in a stressed condition when it is seated within the groove. Thus, if the O-ring is further stretched upon the application of fluid pressure, the O-ring will more readily return to its initially stretched condition when the fluid pressure is reduced.

BRIEF DESCRIPTION OF THE DRAWINGS

FIGS. 4 and 5 illustrate progressive steps employed in forming an O-ring groove according to another aspect of this invention.

FIGS. 6 and 7 illustrate progressive steps employed in forming an O-ring groove according to a further aspect of this invention.

FIGS. 8 and 9 illustrate progressive steps employed in forming an O-ring groove according to a further aspect of this invention.

FIG. 10 is a fragmentary cross sectional view of an O-ring groove being formed in accordance with a still further aspect of this invention.

FIG. 11 is a plan view of an O-ring groove formed by the technique illustrated in FIG. 10.

DETAILED DESCRIPTION OF THE INVENTION

Figure 1:
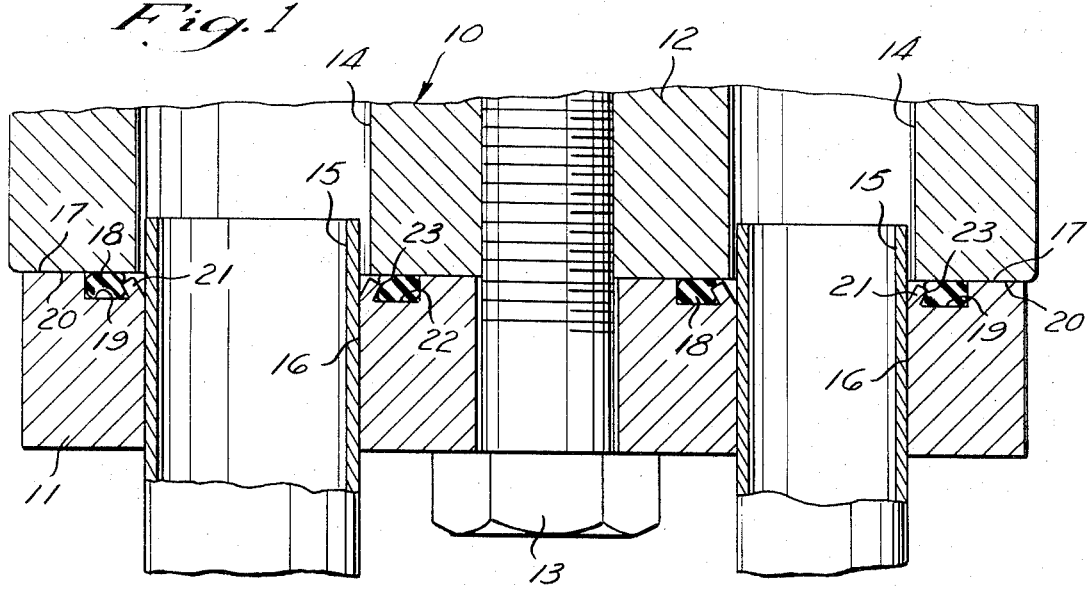
FIG. 1 is a cross sectional view illustrating an O-ring seal assembly according to one aspect of this invention.

Referring now to the drawings in greater detail, and particularly to FIG. 1, a face seal assembly 10 is illustrated. The face seal assembly 10 is intended to form a fluid-tight connection between members which are fastened together in face-to-face apposition. In the particular embodiment illustrated in FIG. 1, the assembly includes a plate member 11 which is fastened to a ported member 12 by a bolt 13. The ported member 12 includes a pair of ports 14 which are in fluid communication with a pair of tubes 15. The tubes 15 are brazed or otherwise affixed within bores 16 provided in the member 11.

The ends of the tubes 15 project beyond a planar face 17 of the member 11 so that the projecting end portions serve as pilot members to initially locate the tubes and ports in substantial alignment to facilitate assembly of the members 11 and 12 and to facilitate the fastening of these members with the bolt 13.

Fluid pressure within the ports 14 and the tubes 15 is sealed by O-rings 18. Each O-ring 18 is trapped within an annular O-ring groove 19 and provides a seal between the planar face 17 of the member 11 and a planar face 20 of the member 12.

The O-rings 18 are trapped within the groove 19 by an annular sidewall 21 which is flared outwardly in a manner which will hereinafter become apparent so that it is stressed beyond its elastic limit to form an acute angle with a bottom wall 22 of the groove 19. The stressed sidewall 21 has an upper lip 23 which is spaced from the bottom wall 22 a distance which exceeds the sectional radius of the O-ring and which defines a circle having a diameter less than the outside diameter but greater than the inside diameter of the O-ring. Thus, the O-ring may be trapped within the groove 19 prior to the assembly of the members 11 and 12 by stretching the O-ring and inserting it within the groove 19 so that it tightly embraces the wall 21. The O-ring will be retained in the groove and will not drop out during assembly operations.

Figure 2:
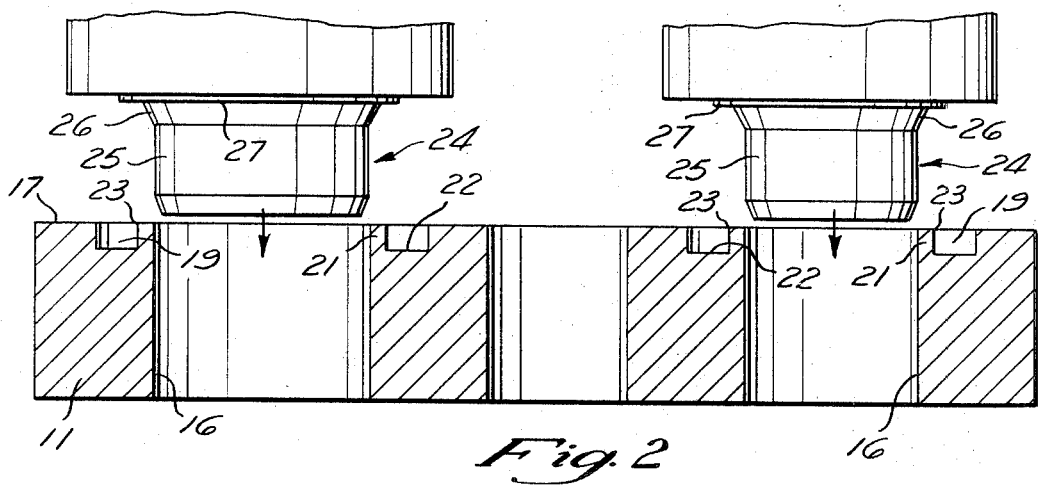
FIGS. 2 and 3 illustrate progressive steps employed in forming the O-ring groove illustrated in FIG. 1.
Figure 3:
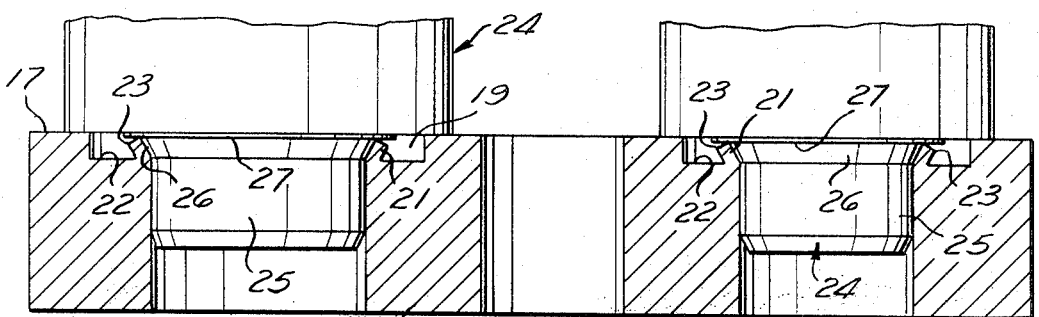

The sidewall 21 is stressed beyond its elastic limit to form the aforementioned acute angle by employing a forming tool 24. As may be seen in FIG. 2, the forming tool 24 includes a cylindrical pilot guide pin 25 which is adapted to enter the bore 16 with a slight clearance. An upper conical portion 26 of the pin 25 flares outwardly at an angle which corresponds to the desired angular deformation of the sidewall 21. After O-ring grooves having straight sidewalls have been machined in the planar face 17 of the member 11, the tool 24 is driven downwardly so that the pin 25 enters the bore 16. If a plurality of bores and O-ring grooves are provided in a single member, as is illustrated in FIG. 2, a corresponding plurality of forming tools 24 may be simultaneously driven into the bores 16. When the conical portion 26 engages the wall 21, the wall 21 is coined and flared radially outwardly to the position illustrated in FIGS. 1 and 3. To ensure that the deformed wall 21 will not project beyond the face 17 to thereby interfere with the seal between the members 11 and 12, an annular boss 27 is provided at the base of the portion 26. As may be seen in FIG. 3, the boss 27 spaces the deformed wall from the plane of the face 17. As clearly illustrated in FIG. 1, the material of the O-ring is adapted to flow into the space between the lip 23 and the member 12 on tightening bolt 13.

Referring now to FIGS. 4 and 5, a sidewall of an O-ring groove may be deformed beyond its elastic limit to form a trap for the O-ring by a technique which involves cutting into the face of the member concentrically around a previously machined O-ring groove and simultaneously forcing the cut sidewall into the groove at a predetermined acute angle with respect to the bottom of the groove. This technique is accomplished by providing a member 30 having a planar face 31 and a bore 32. A groove 33 is cut into the face 31 so that the member 30 resembles the workpiece illustrated in FIG. 2.

To deform a sidewall of the O-ring groove to trap the O-ring to be inserted therein, a forming tool 34 is provided. The forming tool 34 includes a cylindrical pilot guide pin 35 which is adapted to enter the bore 32 with a slight clearance. An angular cutting portion 36 projects from the planar face 37 of the tool 34 and has a conical portion 38 which terminates in a relatively sharp cutting edge 39. By driving the tool 34 downwardly so that the pin 35 enters the bore 32, the cutting edge 39 will engage the face 31 to provide a circular cut in the face which concentrically surrounds the groove 33.

As may be seen in FIG. 5, the circumferential cut forms a wall 41 which surrounds the groove 33. As the wall 41 is formed, it is forced radially inwardly by the conical surface 38 to form an acute angle with the bottom wall of the groove 33. The slope of the surface 38, the depth of the cut, and the radial spacing between the cutting edge 39 and the groove 33 are all selected so that an upper lip 40 of the wall 41 is spaced from the bottom wall of the groove 33 a distance which exceeds the sectional radius of the O-ring and which defines a circle having a diameter less than the outside diameter but greater than the inside diameter of the O-ring. Thus, when an O-ring is inserted within the groove 33, it is trapped therein by the wall 41 and its lip 40. If desired, the portion of the face 37 within the cutting portion 36 may be displaced slightly below the plane of the remainder of the face 37 to ensure that upper portions of the wall 41 do not extend beyond the plane of the face 31.

According to a further aspect of this invention, and as is shown in FIGS. 6 and 7, a trap for an O-ring may be formed by cutting into the face of the planar member concentrically within an O-ring groove to simultaneously force a sidewall into the groove at an acute angle. In FIG. 6, a blank 45 is provided. The blank 45 is similar to the blanks illustrated in FIGS. 1, 2, and 4, and includes a bore 46 and a surrounding O-ring groove 47. An inner wall 48 of the groove 47 is coined radially outwardly and into the groove 47 to form an acute angle with the bottom wall thereof by a forming tool 49. The forming tool 49 has a cylindrical pilot guide pin 50 which is surrounded by a cutting portion 51. The cutting portion 51 includes a conical portion 52 which terminates in a relatively sharp cutting edge 53. The other end of the conical portion 52 terminates in an annular boss 54 which projects a slight distance from a planar face portion 55 of the tool 49.

By driving the tool downwardly so that the pin 50 enters the bore 46, the cutting edge 53 cuts into a planar face 56 of the member 45 so that the wall 48 of the groove 47 is deformed radially outwardly and into the groove. The boss 54 ensures that the top of the wall 48 will not project beyond the plane of the face 56.

The slope of the portion 52, the depth of cut of the edge 53, and the radial spacing between the cutting edge 53 and the groove 47 are selected so that the wall 48 forms an acute angle with the bottom of the groove 47 and so that an upper lip 58 of the wall 48 is spaced from the bottom wall of the groove a distance which exceeds the sectional radius of the O-ring to be inserted in the groove and defines a circle having a diameter less than the outside diameter but greater than the inside diameter of the O-ring. Thus, an O-ring may be inserted and trapped within the groove 47 by stretching the O-ring over the lip 58. If desired, the diameter of the O-ring may be selected so that the O-ring is in a stressed condition in the groove 47. If the O-ring is in a stressed condition prior to the application of fluid pressure, it will more readily return to its normal stressed condition after fluid pressure is relieved, thus minimizing any tendency of the O-ring to be extruded outwardly between the faces of the members when fluid pressure is applied and to remain in that condition when fluid pressure is relieved.

Referring now to FIGS. 8 and 9, an O-ring groove according to a further aspect of this invention is illustrated. According to this aspect of the invention, an O-ring groove 60 is machined in the planar face 61 of a blank 2. A groove or annular slot 63 is machined in the blank 62 so that it circumscribes and is concentric with the groove 60. The slot 63 and the groove 60 define an annular wall 64 which is deformed radially inwardly to the position illustrated in FIG. 9 so that it forms an acute angle with the bottom wall of the groove 60 to thereby form a trap to retain an O-ring. The sidewall 64 is deformed so that a lip 65 is spaced from the bottom wall of the groove 60 a distance which exceeds the sectional radius of the O-ring and which defines a circle having a diameter less than the outside diameter but greater than the inside diameter of the O-ring. The wall 64 may be deformed by employing a coining tool similar to the tool illustrated in FIG. 4 to wedge the sidewall 64 radially inwardly. Alternately, a spinning tool may be employed to perform the deforming operation. It should be appreciated, moreover, that the slot 63 may be provided radially inwardly with respect to the groove 60 so that an inner wall of the groove 60 may be deformed radially outwardly to form the O-ring trap.

Referring now to FIGS. 10 and 11, an O-ring groove according to a still further aspect of the invention is illustrated. According to this aspect of the invention, an O-ring groove 70 is machined in the planar face 71 of a blank 72. A series of indentations 73 is made in the planar face 71 so that portions 74 of a sidewall 75 are stressed beyond their elastic limit to form acute angles with the bottom wall of the groove 70 and to thereby form a trap for an O-ring. Portions 74 of the sidewall may be deformed by employing a conventional prick punch 76.

Although a preferred embodiment of the invention has been shown and described in detail, it is to be understood that various modifications and rearrangements may be resorted to without departing from the scope of the invention.

What is claimed is:

1. A face seal for effecting a seal between planar surfaces comprising a member having a planar surface, means defining an annular groove in said surface, said groove-defining means including a bottom wall and inner and outer concentric sidewalls, at least a portion of at least one of said sidewalls being in a state wherein it is stressed beyond its elastic limit to define an acute angle with said bottom wall, a cross-section of said groove taken through said portion being defined by substantially straight lines and an O-ring within said groove, said O-ring having a smoothly curved cross-section extending from said bottom wall and beyond said planar surface, said one of said sidewalls including a lip portion spaced from said planar surface toward said bottom wall to provide a passage for the reception of the material of the O-ring upon mating of said planar surface with a surface with which it is used.

2. A face seal according to claim 1, wherein said O-ring tightly embraces said inner wall and is stressed within its elastic limit.

3. A face seal according to claim 1, wherein a concentric port is provided in said member within and concentric with said groove and, with said groove, defines an annular wall.

* * * * *